(12) United States Patent
Horikawa et al.

(10) Patent No.: US 8,992,064 B2
(45) Date of Patent: Mar. 31, 2015

(54) PLANAR ILLUMINATION DEVICE AND METHOD OF PRODUCING SAME

(75) Inventors: Tomotaka Horikawa, Nagano (JP); Masahito Totsuka, Nagano (JP); Shinji Kawai, Nagano (JP); Satoshi Kawashima, Nagano (JP)

(73) Assignee: Minebea Co., Ltd., Nagano (JP)

( * ) Notice: Subject to any disclaimer, the term of this patent is extended or adjusted under 35 U.S.C. 154(b) by 225 days.

(21) Appl. No.: 13/435,301

(22) Filed: Mar. 30, 2012

(65) Prior Publication Data

US 2013/0135898 A1 May 30, 2013

(30) Foreign Application Priority Data

Nov. 25, 2011 (JP) ................. 2011-257926

(51) Int. Cl.
*F21V 7/04* (2006.01)
*F21V 8/00* (2006.01)
*F21V 13/08* (2006.01)
*G02F 1/1335* (2006.01)

(52) U.S. Cl.
CPC ........ *G02F 1/133608* (2013.01); *G02B 6/0055* (2013.01); *G02B 6/0088* (2013.01); *G02B 6/0091* (2013.01); *G02F 1/133605* (2013.01); *G02F 2201/08* (2013.01)
USPC ........... 362/609; 362/600; 362/608; 362/633; 349/58

(58) Field of Classification Search
CPC ... F21S 8/00; F21V 1/00–7/00; G02B 6/0091
USPC ............... 362/608, 609, 612, 613; 349/58, 65
See application file for complete search history.

(56) References Cited

U.S. PATENT DOCUMENTS 7,948,573 B2 * 5/2011 Kang et al. ...................... 349/58
8,154,680 B2 * 4/2012 Doyle et al. ..................... 349/58
(Continued)

FOREIGN PATENT DOCUMENTS

JP 11-052140 A 2/1999
JP 2004-071425 A 3/2004
(Continued)

OTHER PUBLICATIONS

German Office Action created on Jun. 2, 2014 for the corresponding DE patent application 10 2012 111 371.8.

*Primary Examiner* — Sikha Roy
(74) *Attorney, Agent, or Firm* — Carrier Blackman & Associates, P.C.; William D. Blackman; Joseph P. Carrier (57) ABSTRACT

A planar illumination device includes a light source unit, including a substantially planar emitting surface, configured to emit light to illuminate a substantially planar object, and a frame, formed in a frame shape enclosing the light source unit, disposed on an outer circumferential side of the light source unit, configured to hold the light source unit. The frame includes a reflecting part configured to reflect the light, and an absorbing part, formed integral with at least a part of an outer circumferential surface of the reflecting part, configured to absorb the light. The reflecting part and the absorbing part include joint interface therebetween that is inclined to a direction vertical to the emitting surface.

9 Claims, 5 Drawing Sheets

(56) References Cited

U.S. PATENT DOCUMENTS

| | | | |
|---|---|---|---|
| 8,411,229 B2 | 4/2013 | Choo et al. | |
| 8,659,718 B2* | 2/2014 | Sekiguchi et al. | 349/58 |
| 2008/0079865 A1* | 4/2008 | Kang et al. | 349/61 |
| 2008/0204624 A1* | 8/2008 | Fu | 349/58 |
| 2009/0033824 A1* | 2/2009 | Nishikawa et al. | 349/58 |
| 2011/0255023 A1 | 10/2011 | Doyle et al. | |
| 2012/0026424 A1* | 2/2012 | Youk et al. | 349/62 |
| 2012/0063167 A1 | 3/2012 | Ozawa et al. | |
| 2012/0300154 A1* | 11/2012 | Tanaka | 349/58 |

FOREIGN PATENT DOCUMENTS

| | | | |
|---|---|---|---|
| JP | 2004-118125 A | | 4/2004 |
| JP | 2005-302485 A | | 10/2005 |
| JP | 2008-129240 A | | 6/2008 |
| JP | 2009-026713 A | | 2/2009 |
| JP | 2010-223999 A | | 10/2010 |
| JP | 2010223999 A | * | 10/2010 |
| JP | 2012-59372 A | | 3/2012 |
| WO | WO 2011102033 A1 | * | 8/2011 |

* cited by examiner

PLANAR ILLUMINATION DEVICE AND METHOD OF PRODUCING SAME

CROSS REFERENCE TO RELATED APPLICATION

This application claims the foreign priority benefit under Title 35, United States Code, §119(a)-(d) of Japanese Patent Application No. 2011-257926, filed on Nov. 25, 2011 in the Japan Patent Office, the disclosure of which is herein incorporated by reference in its entirety.

BACKGROUND OF THE INVENTION

1. Field of the Invention

The present invention relates to a planar illumination device for emitting light from a light source to illuminate a planar object and a method of producing the same.

2. Description of the Related Art

Planar illumination devices are known which can be used as a backlight for an LCD (liquid crystal display) device of a cellular phone, etc., for lighting over a surface of the LCD device. In the planar illumination device, a white plastic frame is used at a background region of the light source because white has a high reflectivity.

JP 2004-71425 A, JP 2005-302485 A, JP 11-52140 A, and JP 2004-118125 A are prior art of the present invention.

In the prior art, when the white plastic frame is used, a small amount of light transmitting through the white plastic frame may leak at an outer circumference of the frame to outside of the frame. Recent cellular phones have a lot of functions such as a camera function and thus, the small amount of light leak through the white frame may adversely influence on sensors for such a function.

SUMMARY OF THE INVENTION

An aspect of the present invention provides a planar illumination device having a preferable optical characteristic in which light leak is suppressed and a method of producing the same.

An aspect of the present invention provides a planar illumination device comprising:

a light source unit, including a substantially planar emitting surface, configured to emit light;

a frame, formed in a frame shape enclosing the light source unit, disposed on an outer circumferential side of the light source unit, configured to hold the light source unit, the frame comprising;

a reflecting part configured to reflect the light; and an absorbing part, formed integral with at least a part of an outer circumferential surface of the reflecting part, configured to absorb the light, wherein the reflecting part and the absorbing part include a joint interface therebetween that is inclined to a direction vertical to the emitting surface on a circumferential side of the frame.

An aspect of the present invention provides a planar illumination device comprising:

a light source unit, including a substantially planar emitting surface, configured to emit light to illuminate a substantially planar object;

a frame, formed in a frame shape enclosing the light source unit, disposed on an outer circumferential side of the light source unit, configured to hold the light source unit, the frame comprising;

a reflecting part configured to reflect the light; and an absorbing part, formed integral with at least a part of an outer circumferential surface of the reflecting part, configured to absorb the light, wherein the light source unit comprises a reflection sheet, disposed on side opposite to the emitting surface, configured to reflect the light, wherein the frame comprises a step part on which a part of the reflection sheet is disposed on a side opposite to the emitting surface, wherein the step part extends from the reflecting part to the absorbing part.

An aspect of the present invention provides a method of producing a planar illumination device comprising:

a light source unit, including a substantially planar emitting surface, configured to emit light to illuminate a substantially planar object;

a frame, formed in a frame shape enclosing the light source unit, disposed on an outer circumferential side of the light source unit, configured to hold the light source unit, the frame comprising;

a reflecting part configured to reflect the light; and an absorbing part, formed integral with at least a part of an outer circumferential surface of the reflecting part, configured to absorb the light, the method comprising molding the frame by a two-color molding process, wherein the light absorbing part is molded after the reflecting part is molded.

According to the present invention, the planar illumination device may have a preferable optical characteristic in which light leak is suppressed and a method of producing the same.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

With reference to drawings will be described embodiments of the present invention.

First Embodiment

Figure 1A:
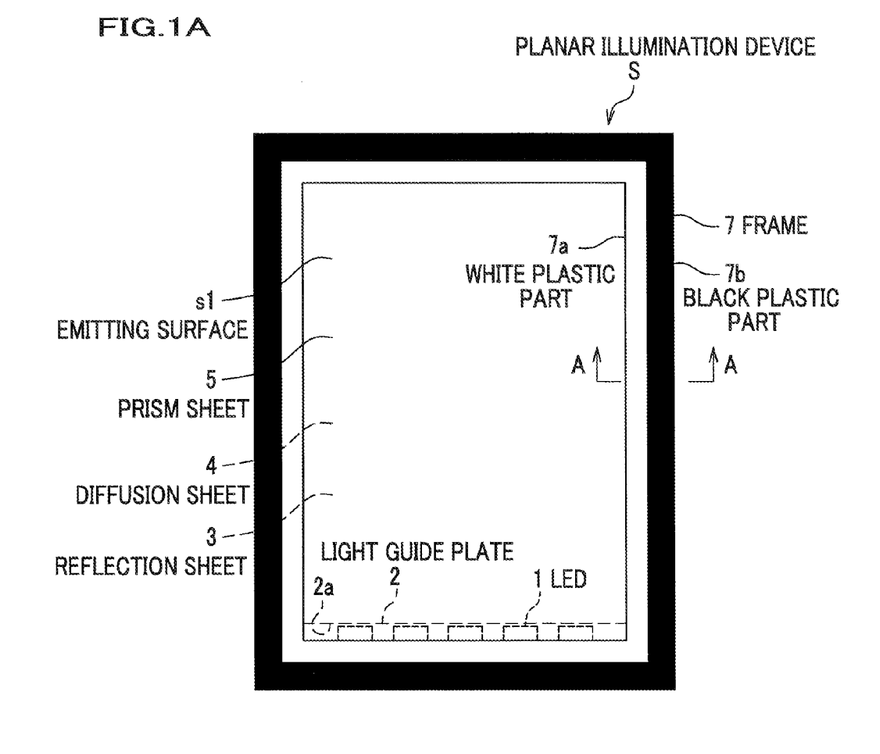
FIG. 1A is a front view of a planar illumination device according to a first embodiment of the present invention.
Figure 1B:
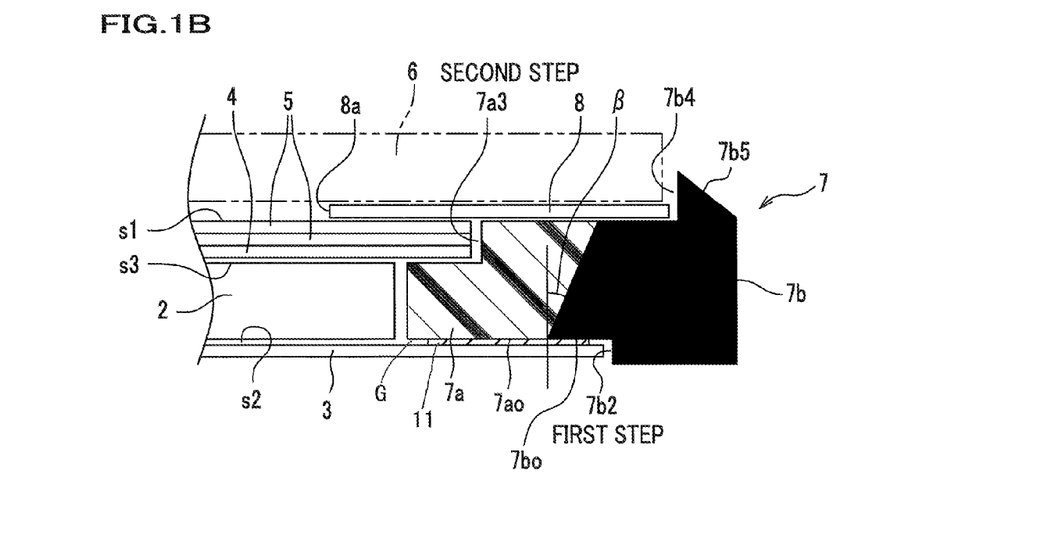
FIG. 1B is a cross section view taken along line A-A in FIG. 1A.

FIG. 1A is a front view of a planar illumination device according to a first embodiment of the present invention, and FIG. 1B is a cross section view taken along line A-A in FIG. 1A.

The planar illumination device S according to the first embodiment is used to light, for example, an LCD panel from a back side of the LCD panel as a display in a cellular phone, etc. i.e., used as a backlight, etc.

Configuration of the planar illumination device S will be described in detail.

The planar illumination device S has a rectangular shape in the front view as shown in FIG. 1A and a configuration of a side-light type backlight, in which a plurality of LEDs (Light Emitting Diode) 1 as a light source are disposed so as to face a side face 2a of the light guide plate 2. The LEDs 1 are disposed on a side (flank) of the light guide plate 2.

A light guide plate 2 which is a thin (substantially flat) plate having a rectangular shape is disposed so as to face the LEDs 1 at one end thereof. The light guide plate 2 spreads the light emitted by the LEDs 1 along an extending plane thereof and guides toward a front thereof (face side of FIG. 1A, a side of the LCD panel 6 arranged on an upper side of FIG. 1B) over an emitting surface s3 of the light guide plate 2. The light guide plate 2 is, as shown in FIGS. 1A and 1B, surrounded by a frame 7 having a rectangular frame shape.

Disposed behind the light guide plate 2 is a reflection sheet 3 having a larger size than the light guide plate 2, i.e., having such a size that ends of the reflection sheet $3_{[h1]}$ are housed (disposed) within an inner surface of the frame 7 (see FIG. 1B). The reflection sheet 3 reflects diffusely light leaked from a reverse side of the light guide plate 2 because the incident angle of light inside the light guide plate 2 to the back face of the light guide plate 2 becomes outside the total reflection condition to guide the light from the light guide plate 2 toward the front of the light guide plate 2 (a side of the LCD panel 6 in FIG. 1B).

In front of the light guide plate 2 (the top face of FIG. 1A, the side of the LCD panel 6 in FIG. 1B) there are disposed a diffusion sheet 4 having a rectangular shape for diffusing light from the light guide plate 2 is disposed on the light guide plate 2 to homogenize luminance over a surface thereof, and a pair of prism sheets 5 having a rectangular shape to increase luminance by collecting in a front direction is disposed on the diffusion sheet 4 on a side of an emitting surface s1 (a top surface of the upper prism sheet 5) of the planar illumination device S. The emitting surface s1 is substantially planar$_{[h2]}$, but may be a planar rough surface.

In front of the prism sheet 5, the LCD panel 6 is disposed which generates a color light image from the light guided by the light guide plate 2 such that the light transmitting through a liquid crystal layer is controlled in accordance with voltages, corresponding to an image, applied to electrodes of the LCD panel 6.

The frame 7 made of plastics is installed so as to enclose (surrounds) an outer circumference of the LEDs 1, the light guide plate 2, the reflection sheet 3, the diffusion sheet 4, a pair of prism sheets 5, and the LCD panel 6 to form an outer circumferential part of the planar illumination device S. The frame 7 serves as an optical member and a supporting member (rigid member) in the planar illumination device S.

Between the frame 7 and the LCD panel 6, a light shielding sheet 8 for preventing light emitted by the LEDs 1 from leaking to the outside.

Figure 2A:
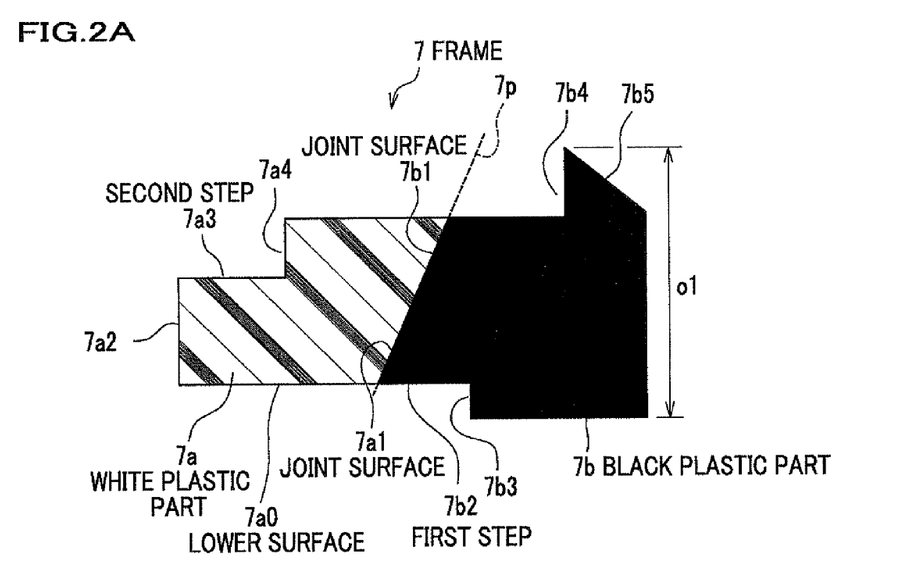
FIG. 2A is a cross section view, taken along line A-A in FIG. 1A, of a frame forming an outer circumferential part of the planar illumination device according to the first embodiment of the present invention.
Figure 2B:
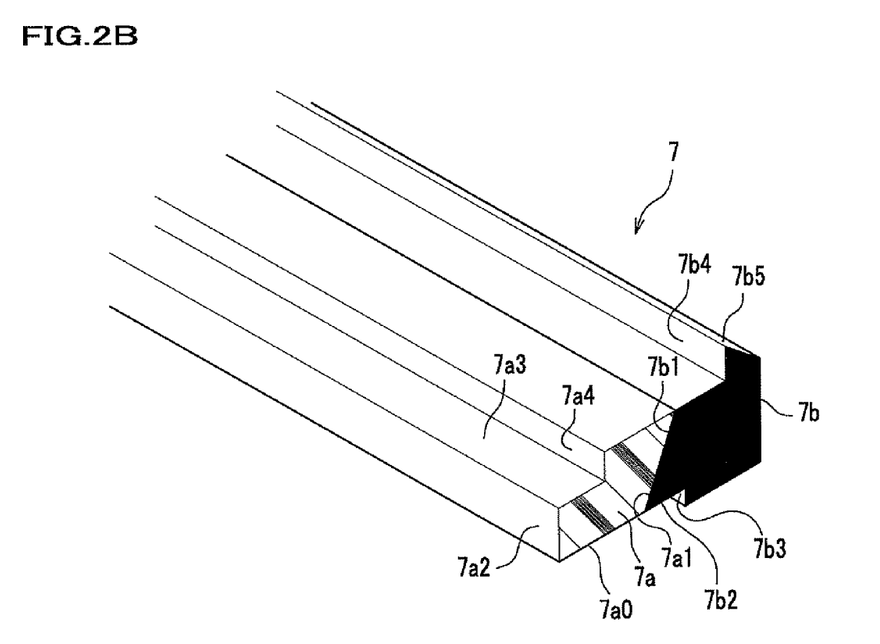
FIG. 2B is a perspective view of the frame shown in FIG. 2A.

FIG. 2A is a cross section view, taken along line A-A in FIG. 1A, for illustrating the frame forming an outer circumferential part of the planar illumination device according to the first embodiment of the present invention. FIG. 2B is a perspective view of the frame shown in FIG. 2B.

The frame 7 is produced by two-color injection molding in which an inner circumferential side of the frame 7 is a white plastic part 7a made of a white plastic and an outer circumferential side of the frame 7 is a black plastic part 7b made of a black plastic.

More specifically, the frame 7 is formed with the white plastic part 7a as a reflecting part for reflecting the light from the LEDs 1 on the inner circumferential side (facing an outer circumferential side surface of the light guide plate 2) and the black plastic part 7b on the outer circumferential side as a light absorbing part for absorbing the light from the LEDs 1.

The white plastic part 7a as the reflecting part which is white in the frame 7 reflects out-going light from the LEDs 1 in an inward direction. On the other hand, the black plastic part 7b as the light absorbing part which is black in the frame 7 absorbs the light leaked from the white plastic part 7a to decrease (suppress) leakage from the frame 7 to the outside.

There are two noticeable points in molding the frame 7.

First, to mold the two-color plastic frame 7, either one of two color plastic parts (for example, a white plastic part) is molded with a first mold, and then the molded piece is inserted into a second mold. Next, the other plastic material (for example, a black plastic material) is injected into a cavity of the second mold. Accordingly, the frame 7 having two colors is molded such that two different color pieces (black and white pieces in the first embodiment) are combined.

However, when the first molded piece of the frame 7 is inserted into the second mold, if a position of the inserted first molded piece is not stable in the second mold, it is not possible to inject the other plastic.

Second, if a ratio of widths which both white plastic material and the black plastic material occupy in the plastic frame 7 is not adjusted, the molded plastic frame 7 may be curved due to a stress generated during solidification because of cooling under a glass transition temperature or a melting point.

In the planar illumination device S, to avoid decrease in an optical characteristic, the black plastic is disposed at a maximum area to prevent the light leakage as possible as a surface area and a volume (thickness) of the white plastic for reflection can be ensured. In addition, it is necessary to reinforce a joint between both plastic materials by increasing a welding area of the white and black plastic materials.

In order to cope with the first and second noticeable points, the frame 7 for the planar illumination device S is configured as follows:

As shown in FIG. 2A, in the frame 7, joint surfaces 7a1 and 7b1 which are welding surfaces (flat in this embodiment) forming a border between the white plastic part 7a and the black plastic part 7b are, i.e., a joint interface 7p is, inclined to a direction vertical to the emitting surface s1 such that as a point on the joint surfaces 7a1 and 7b1 (the joint interface 7p) approaching a plane including the emitting surface s1, the point shifts toward an outer circumference of the frame 7.

In other words, the joint surface 7a1 of the white plastic part 7a and the joint surface 7b1 of the black plastic part 7b are inclined to the direction vertical (up-down direction in FIG. 1B) to the emitting surface s1 such that locations of the joint surfaces 7a1 and 7b1 at a top surface of the frame 7 on a side of the emitting surface s1 is more outer than locations of the joint surfaces 7a1 and 7b1 at the bottom of the frame 7 (on a side of reflecting surface s2).

As shown in FIG. 1B, a first step 7b2 is formed in a such shape as to house or dispose an end of the reflection sheet 3 having a rectangular shape, and extends from a lower surface 7a0 of the white plastic part 7a to a lower surface 7b0 of the black plastic part 7b to provide a bottom of a hollow together with a lower surface of the light guide 2 to house the reflection sheet 3 in the hollow.

On the other hand, in the white plastic part 7a, a lower inner side wall 7a2 (see FIG. 2B) faces the light guide plate 2 and has a second step 7a3 to house ends of a pair of the prism sheets 5.

In addition, on the white plastic part 7a, the light shielding sheet 8 (see FIG. 1B) is disposed and a third step 7b4 is formed in the black plastic part 7b to house (dispose) an end of the light shielding sheet 8 on the black plastic part 7b. An outer upper part of the black plastic part 7b is chamfered to have a chamfered surface 7b5.

As described above, the joint surface 7a1 of the white plastic part 7a and the joint surface 7b1 of the black plastic part 7b are inclined to the direction vertical to the emitting surface s1 on an outer circumferential side. The inclination of the joint surfaces 7a1 and 7b1 provides an advantageous effect as follows:

The joint surfaces 7a1 and 7b1 are formed with inclination toward the outer circumferential side, which makes a joint area between the white plastic part 7a and the black plastic part 7b larger than that in the case there is no inclination. Accordingly, a joining strength between the white plastic part 7a and the black plastic part 7b can be ensured because the joining area are expanded though a thickness of the frame 7 is made thinner than a thickness of the frame 7 (in an up and down direction size of in FIG. 2A) in accordance with a demand for thickness reduction in the planar illumination device S.

In addition, easiness in drafting the mold (cavity) (easiness in opening molds) just after molding either pieces of the frame 7 (the first molding piece out of the white plastic part 7a and the black plastic part 7b) becomes good. This is because the joint surfaces 7a1 and 7b1 are inclined so as to approach vertical to a stripping direction, with the result that a force for separating the joint surfaces 7a1 and 7b1 from the mold is more effectively applied between the molded piece and the mold (cavity).

In addition, drafting the mold can be effectively made. This suppresses a deformation of the frame which may occur while the mold is drafted. Accordingly, the frame 7 having accurate dimensions can be obtained.

In addition, as shown in FIG. 1B, the joint surface 7a1 of the white plastic part 7a and the joint surface 7b1 of the black plastic part 7b are inclined in such a direction that locations of the joint surfaces 7a1 and 7b1 at a top surface of the frame 7 on a side of the emitting surface s1 is more outer than locations of the joint surfaces 7a1 and 7b1 at the bottom of the frame 7 (on a side of reflecting surface s2).

The inclination of the joint surfaces 7a, 7b in the above-described direction provides further three advantageous effects as follows:

First, as shown in FIG. 1B, an area to which the reflection sheet 3 disposed on a back face of the light guide plate 2 faces the black plastic part 7b can be made larger. This configuration causes the black plastic part 7b facing the reflection sheet 3 to absorb the light incident into an interface 20 between the black plastic part 7b and the reflection sheet 3 (generally a double-sided adhesive tape 11 is intervened) and propagating through the interface at a part thereof facing the reflection sheet 3. As seen in the drawing of FIG. 1B, a small gap G is provided between the reflection sheet 3 and the frame 7. The gap G extends toward the vertical wall 7b3, and the vertical wall effectively stops light transmitted through the gap.

As the result, an amount of light propagating through the interface between the black plastic part 7b and the light guide plate 2 and finally 25 leaking outside can be decreased. Regarding this, use of the double-sided adhesive tape 11 (fixing part), having a light absorbing characteristic, to fix the reflection sheet 3 can decrease the amount of the leaked light, by absorbing the light propagating through the interface with the double-sided adhesive tape.

Second, on the back face of the frame 7, an inner side of the first step 7b2 for housing an end of the reflection sheet 3 is formed extending from the lower face 7a0 of the white plastic part 7a to the lower surface 7b0 of the black plastic part 7b. This provides a sufficient width of an area of the lower surfaces 7a0 and 7b0 for placing the reflection sheet 3 where the end of the reflection sheet 3 faces the lower surfaces 7a0 and 7b0.

In addition, a vertical wall 7b3 of the first step part 7b2 (see FIG. 2A) is formed as a part of the black plastic part 7b, so that the light which has not been absorbed at the interface between the reflection sheet 3 and the frame 7 can be absorbed by the black vertical wall 7b3 of the first step 7b2. This absorption further decreases the externally leaked light.

If a width of the part of the black plastic part 7b facing the reflection sheet 3 can be sufficiently secured, the joint surfaces 7a1, 7b1 can be provided without inclination because an area of the black plastic 7b is large. In other words, in a case where the part of the black plastic part 7b facing the reflection sheet 3 can be surely provided, it is allowed not to incline the joint surfaces 7a1, 7b1.

Third, it is possible to keep an area for forming the second step 7a3 on the white plastic part 7a for placing the optical sheets such as the diffusion sheet 4 and a pair of the prism sheet 5 on a side of the emitting surface s1 of the white plastic part 7a in a narrow frame shape. This returns the light leaked from an end of the optical sheets such as the diffusion sheet 4 or the pair of prism sheets 5 to an effective region side of the backlight (a side of the emitting surface s1 facing the light guide plate 2) such that the leaked light is reflected by the vertical wall 7a4 of the white plastic part 7a.

<Method of Molding Frame 7>

FIGS. 3A to 3E illustrate processes in a method of molding the frame 7 according to the first embodiment.

The method of molding (producing) the frame 7 having two colors is as follows:

The molding the frame 7 having two colors includes five processes A to E as follows:

Process A

A movable primary cavity 1C which is a mold having a hollow is moved in a front direction (as shown by an arrow a1 in FIG. 3A) to be set on a fixed core Co which is a mold protrusive. Next a melting white plastic is injected from an injection nozzle (not shown) through a gate 1Ca for the cavity 1C into a cavity space k1 between the core Co and the primary cavity 1C to injection-mold the white plastic part 7a.

Process B

The primary cavity 1C is moved rearward (as shown by an arrow a2 in FIG. 3B) to open a set of the fixed core Co and the primary cavity 1C. In this case, the white plastic part 7a is stuck on the fixed core Co and molded. The white plastic in the gate 1Ca is solidified and attached to at a place corresponding to the gate 1Ca of the primary cavity 1C as a protrusion of the white plastic so-called a gate$_{[h5]}$ ridge g1 on the white plastic part 7a.

Process C

Figures 3A, 3B, 3C:
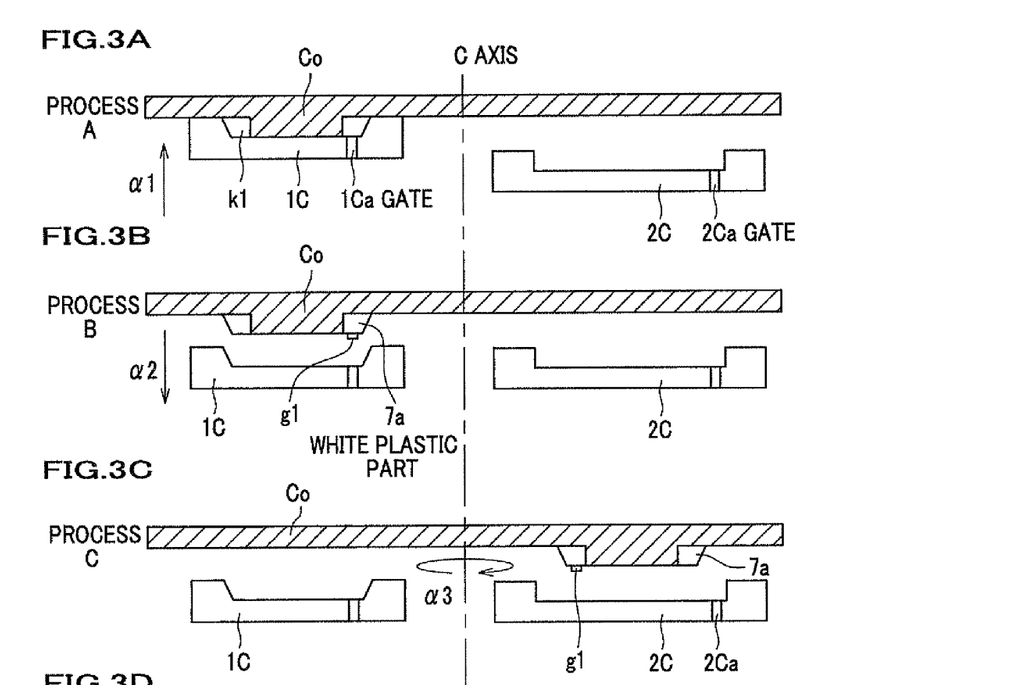
FIGS. 3A to 3E are cross section views for illustrating a process of molding the frame according to the first embodiment of the present invention.

A plate supporting the core Co is rotated by 180 degrees about an axis C (in a rotation direction a3), to move the white plastic part 7a stuck on the fixed core Co to a location which a second cavity 2C, being movable and serving as a second hollow mold, faces. More specifically, the white plastic part 7a which will be disposed$_{[h6]}$ on the side of the light guide plate 2 is molded in advance. In such a state that the white plastic molded part sticks on the inner mold (core Co: a shared mold between the white plastic and the black plastic), the white plastic molded part is moved to the secondary cavity 2C for molding the black plastic part 7. It is note that the white plastic part 7a is stably located in the mold (core Co) because the white plastic part 7a sticks on the shared mold (core Co).
Process D The movable second cavity 2C is moved in a front direction (as shown by an arrow a4 in FIG. 3D to be set on the fixed protruded mold, i.e., the fixed core Co. The black plastic is injected by an injection nozzle (not shown) through a gate 2Ca for the secondary cavity 2C to fill a cavity space k2 between the core Co (white plastic part 7a) and the secondary cavity 2C with the melted black plastic to inject-mold the black plastic part 7b.
Process E The movable second cavity 2C is moved rearward (as shown by an arrow a5 in FIG. 3E) to open the set of molds. After that, an ejector pin (not shown) is moved to remove the molded part (molded frame 7) from the core Co to take out the molded frame 7 from the core Co. The black plastic in the gate 2Ca is solidified and sticks on a place corresponding to the gate 2Ca of the secondary cavity 2C as a protrusion of the black plastic so-called a gate$_{[h7]}$ ridge g2 on the black plastic part 7a.

Accordingly, the gate ridge g2 on the black plastic part 7b is removed at need.

As described above, molding the frame 7 is completed.

Figure 5:
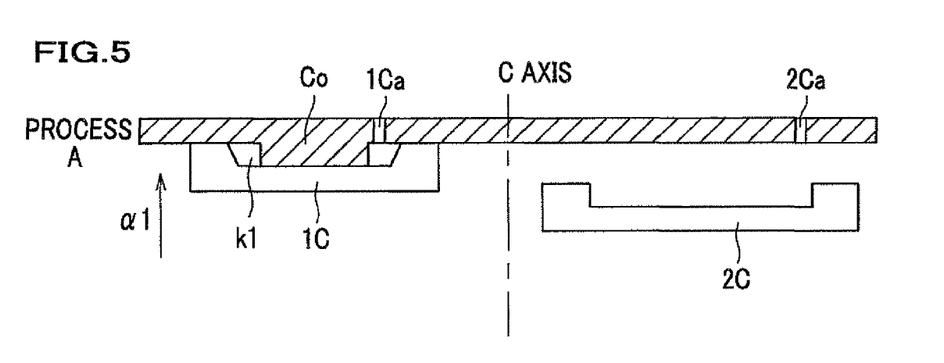
FIG. 5 is a cross section view of a set of molds for the frame according to a modification of the first embodiment.

In the processes described above, the gate 1Ca is formed in the primary cavity 1C (a side of the reflection surface s2) and the gate 2Ca is formed in the secondary cavity 2C (a side of reflection surface s2) as an example. However, the gates 1Ca and 2Ca may be formed in the core Co. FIG. 5 shows such a modification in a cross section view of a set of molds for the frame. In other words, the gates 1Ca, 2Ca may be formed in the primary cavity 1C and the secondary cavity 2C, respectively, or in the fixed core Co as shown in FIGS. 3A and 5.

Next, two features in the method of producing the frame 7 will be described.

First, the white plastic part 7a on an inner circumferential side is molded in advance. After that, the black plastic part 7b on an outer circumferential side is molded.

This prevents a position of the white plastic part 7a from shifting from a center position of the core Co though the core is rotated by 180 degrees (as shown by the arrow a3) in the process C by sticking of the white plastic part 7a on the core Co accompanying contraction just after molding. As a result, molding the frame 7 can be provided at a high dimension accuracy.

Second, the gate ridge g1 necessarily formed on the white plastic part 7a can be eliminated (crushed) by that the second cavity 2C is pressed on the core Co while the second cavity 2C is closed toward the core Co in the following process D molding the black plastic part 7b.

As shown in FIG. 1B, because the white plastic part 7a is disposed to directly face a side surface of the light guide plate 2 to reflect light incident to a surface thereof, the gate ridge g1 (in the process B in FIG. 3B) has a greater influence on a illumination characteristic than black plastic part 7b. Accordingly, the gate ridge g1 on the white plastic part 7a firstly formed can be eliminated (crushed) in the following process, which provides an extremely effective process for increasing a quality of the planar illumination device S.

The gate 1Ca for molding the white plastic part 7a (see the process A in FIG. 3A) is disposed at a location corresponding to a flat surface of the white plastic (a flat surface on a back face side on the reflection surface s2 in the example shown in FIG. 1B).

Figure 3D:
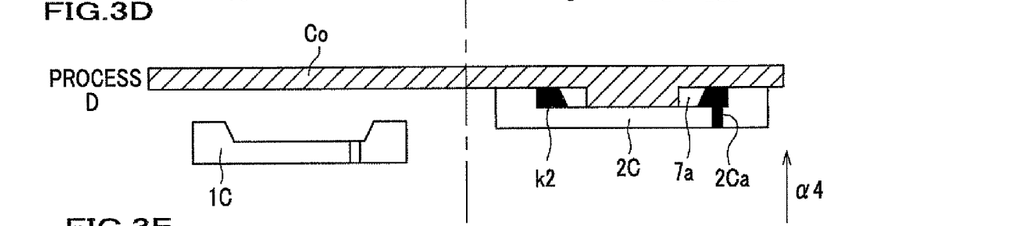
Figure 3E:
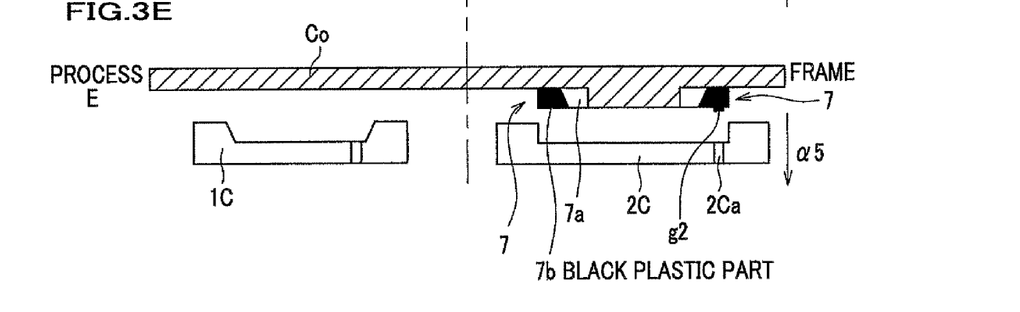

Accordingly, an inner surface of the second cavity 2C which is a heated mold is pressed onto the gate ridge g1 on the white plastic part 7a in the process D in FIG. 3D, the gate ridge g1 being crushed. In other words, the gate ridge g1 necessarily formed on the white plastic part 7a can be eliminated in the process D without any additional process.

In summary, the inclined joint surfaces 7a1, 7b1 between the white plastic part 7a and the black plastic part 7b provides the following advantageous effects.

A volume ratio between the white plastic part 7a and the black plastic part 7b can be determined in consideration of flowability of melted plastic material, so that a degree of freedom in the volume ratio between the white plastic part 7a and the black plastic part 7b can be enhanced.

The inclined joint surfaces 7a1, 7b1 provide increase in a joining area between the white plastic part 7a and the black plastic part 7b.

To reduce (suppress) an amount of leaked light, regions of the black plastic part 7b on a side where the light shielding sheet 8 is adhered and a side where the reflection sheet 3 is adhered can be changed in accordance with a situation of other components.

This configuration makes drafting the white plastic part 7a from the primary cavity 1C in the process B shown in FIG. 3B more preferable.

As described above, the plastic frame 7 is formed with two color materials (white plastic and black plastic) and disposed on a side facing the light guide plate 2 is the white plastic and on a side facing the outside is the black plastic. The white plastic part 7a is disposed on a side of the frame 7 facing the light guide plate 2. This configuration does not influence on an optical characteristic of the backlight. In addition, the black plastic part 7b is disposed on the side facing the outside, exposed to the external, which reduces the light leakage around the backlight.

Accordingly, it is possible to reduce (suppress) light leakage around the frame 7 without deterioration in luminance characteristic of the backlight.

Accordingly, the planar illumination device S provides a preferable optical characteristic in which light leakage is suppressed.

Second Embodiment

Figure 4A:
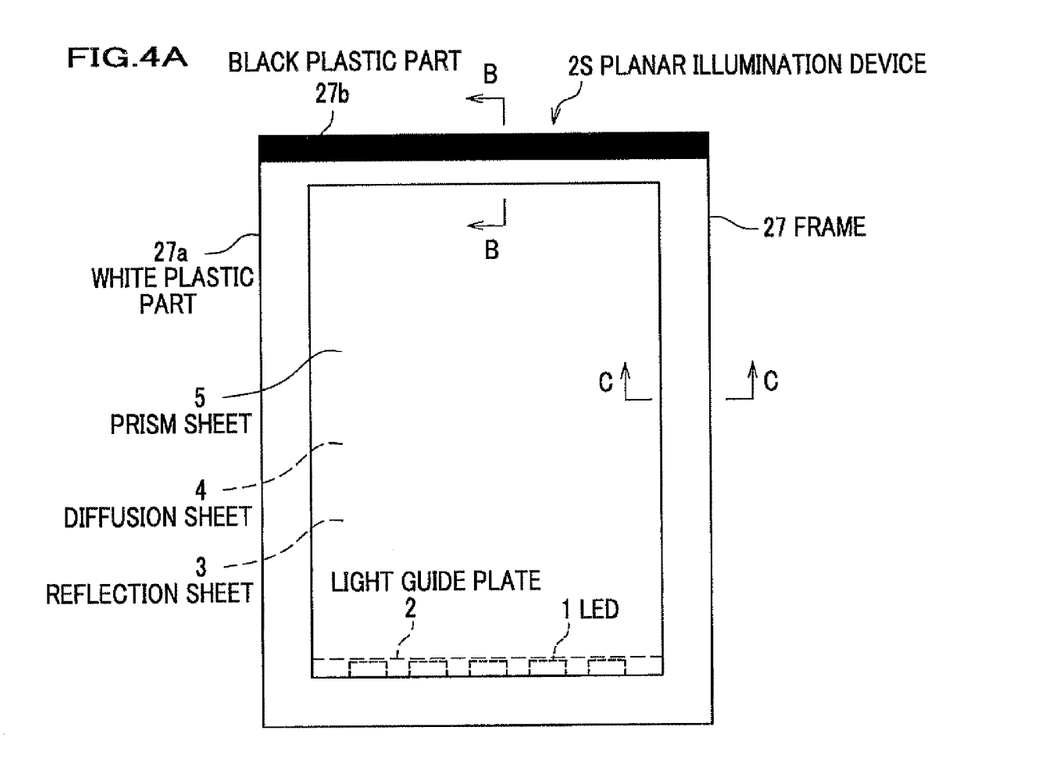
FIG. 4A is a front view of a planar illumination device according to a second embodiment of the present invention.
Figure 4B:
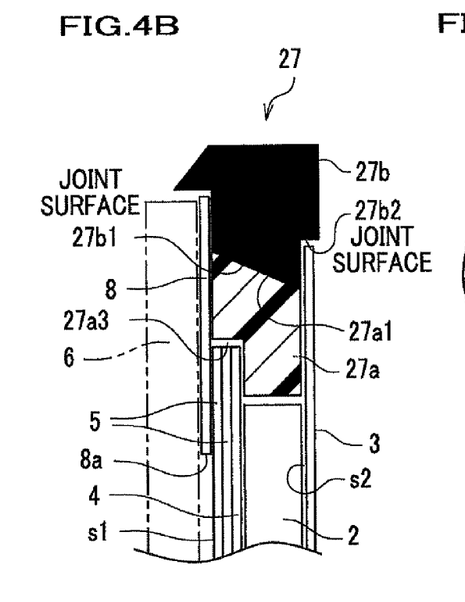
FIG. 4B is a cross section taken along line B-B in FIG. 4A.
Figure 4C:
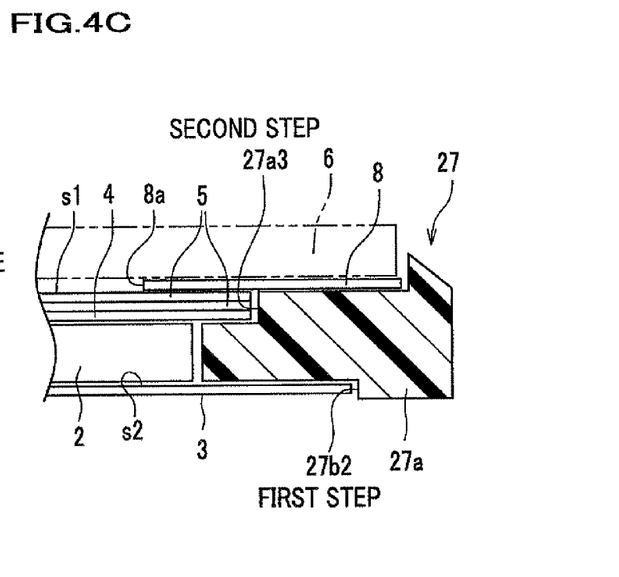
FIG. 4C is a cross section taken along line C-C in FIG. 4A.

FIG. 4A is a front view of a planar illumination device according to a second embodiment. FIG. 4B is a cross section view taken along line B-B shown in FIG. 4A. FIG. 4C is a cross section view taken line C-C shown in FIG. 4A.

The planar illumination device according to the second embodiment has substantially the same configuration as the planar illumination device according to the first embodiment. The difference is in that a frame 27 in the planar illumination device 2S has a black plastic part 27b disposed only at a part thereof instead of the whole of the light source unit (the LEDs 1, the light guide plate 2, the reflection sheet 3, the diffusion sheet 4 and the prism sheets 5).

Because the other configurations are substantially the same as those in the first embodiment, the same elements or parts are designated with the same references or like reference, and thus a duplicated description will be omitted.

For example, in a case where a sensor, etc. (not shown) is disposed near a side of the planar illumination device 2S opposite to the side of the LEDs 1, as shown in FIGS. 4A and 4B, the black plastic part 27b is formed only at the side corresponding side and the other part is formed with the white plastic part 27a.

In the case described above, the black plastic part 27b is formed only at the corresponding side. However, the black plastic part 27b may be formed at other sides of the frame 27. Similarly, it also possible to dispose the black plastic part 27b at least a part surrounding the light source part (the LEDs 1, the light guide plate 2, the reflection sheet 3, the diffusion sheet 4 and the prism sheet 5) at any given location in accordance with locations of the LEDs 1 and various sensors.

According to the configuration describe above, the region of the black plastic part 27b can be changed in accordance with necessity, so that the black plastic part 27b is formed at a specific part where light leakage from the backlight should be prevented to reduce (suppress) light leakage.

Modifications

The joint surfaces 7a1, 7b1 (27a1, 27b1) are, i.e., the joint interface 7p is, not necessarily flat (see FIG. 1B, 4B) but may be curved. This configuration increases a joint force depending on the joint area because the joint area between the white plastic part 7a (27a) and the black plastic part 7b (27b) becomes large.

An inclination angle β of the joint surfaces 7a1, 7b1 (27a1, 27b1) between the white plastic part 7a (27a) and the black plastic part 7b (27b) to the vertical to the plane including the emitting surface s1 wherein the joint surfaces 7a1, 7b1 are inclined outward of the frame 7, 27 is not limited, but is preferably set in a range from 5 to 20 degrees in consideration of flow of the melted plastic during molding and the operations and advantageous effects described above.

In the first and second embodiments, the joint surfaces 7a1, 7b1 of the white plastic part 7a and the black plastic part 7b, respectively, are inclined as an example. However, the planar illumination device can be provided without inclination (vertical) in the joint surfaces 7a1, 7b1. However, because inclined joint surfaces 7a1, 7b1 of the white plastic part 7a and the black plastic part 7b can provide various advantageous effects as described above, this configuration is preferable.

In the first and second embodiments, the two color molding process using the white plastic and the black plastic for the frame 7 (27) are exemplified. However, the frame 7 (27) may be formed with any other plastics having a brightness near the white and a dark color plastic near the black as long as a reflecting part for reflecting the light and an absorbing part for absorbing the light emitted by the LEDs 1 can be provided.

In the first and second embodiments, there are examples in which the joint surfaces 7a1, 7b1, 27a1, 27b1 of the white plastic part 7a, 27a as a reflecting part and the black plastic part 7b, 27b as an absorbing part are inclined to the direction vertical to the emitting surface s1 on the outer circumferential side, i.e., the joint surfaces at a top surface of the frame on a side of the emitting surface s1 is more outer than the joint surfaces at the bottom of the frame on a side of reflecting surface. However, the joint surfaces may be inclined such that the joint surfaces at the bottom of the frame on a side of reflecting surface is more outer than the joint surfaces at a top surface of the frame on a side of the emitting surface s1.

The first and second embodiments and modifications according to the present invention have been described. However, these descriptions are not restrictive, but are typical. Accordingly, various modifications can be made within a scope of the present invention.

The gate ridge g2 on the black plastic part 7b may be left (not eliminated or removed), and removed on a later process.

In the first and second embodiments, the LEDs 1, the guide plate 2, the reflection sheet 3, the diffusion sheet 4, and the prism sheet 5 form a light source unit. The diffusion sheet 4 and the prism sheet 5 serve as the optical sheet. The white plastic part 7a or 27a corresponds to a reflection part. The black plastic part 7b or 27b corresponds to a light absorbing part.

The invention claimed is:

1. A planar illumination device comprising a light source unit and a frame formed in a frame shape and enclosing the light source unit,
    the light source unit comprising:
        a substantially planar emitting surface, configured to emit light to illuminate a substantially planar object; and
        a reflection sheet disposed on a side opposite to the emitting surface and configured to reflect the light;
    wherein the frame is disposed on an outer circumferential side of the light source unit and configured to hold the light source unit, the frame comprising:
        a reflecting part configured to reflect the light;
        an absorbing part, formed integral with at least a part of an outer circumferential surface of the reflecting part and configured to absorb the light; and
        on a side opposite to the emitting surface, a first step part on which a part of the reflection sheet is disposed,
        wherein the first step part extends from the reflecting part to the absorbing part and includes a black vertical wall, disposed adjacent to an edge of the reflection sheet, facing the edge of the reflection sheet at the absorbing part as a part of the absorbing part,
        wherein a gap is formed between a surface of the first step part facing the reflection sheet and the reflection sheet, the gap extending toward the vertical wall,
        and wherein the vertical wall stops light transmitted through the gap.

2. The planar illumination device as claimed in claim 1, wherein the reflecting part and the absorbing part have a joint interface defined therebetween that is inclined at an angle from 5 to 20 degrees to a direction vertical to the emitting surface on a circumferential side of the frame.

3. The planar illumination device as claimed in claim 1,
    wherein the light source unit comprises an optical sheet disposed on a side of the light emitting surface,
    wherein the frame comprises, on the side of the emitting surface with respect to the frame, a second step part on which a part of the optical sheet is disposed,
    and wherein the second step part is formed at the reflecting part.

4. The planar illumination device as claimed in claim 1, wherein the light absorbing part is formed after the reflecting part is formed.

5. The planar illumination device as claimed in claim 4, wherein the reflecting part comprises a gate ridge thereon, formed in a gate configured to mold the reflecting part and removed from the gate, wherein the gate ridge is disposed on a surface of the reflecting part on a side of or opposite to the light emitting surface.

6. The planar illumination device as claimed in claim 1, wherein the light source unit comprises a guide plate and a light source that is disposed on a side of the guide plate.

7. The planar illumination device as claimed in claim 1, wherein the reflection sheet is fixed to the absorbing part with a fixing member having a light absorbing characteristic.

8. The planar illumination device as claimed in claim 2, wherein the joint interface is inclined such that the joint interface at a top surface of the frame on a side of the emitting surface is more outer than the joint interface at the bottom of the frame on a side of reflecting surface.

9. The planar illumination device as claimed in claim 1, further comprising, in the gap, a fixing part configured to fix the reflecting sheet to the frame.

* * * * *